United States Patent
Nichols et al.

(10) Patent No.: US 6,721,328 B1
(45) Date of Patent: Apr. 13, 2004

(54) ADAPTIVE CLOCK RECOVERY FOR CIRCUIT EMULATION SERVICE

(75) Inventors: Richard A. Nichols, Richardson, TX (US); Jonathan R. Belk, Richardson, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/443,662

(22) Filed: Nov. 19, 1999

(51) Int. Cl.[7] .......................... H04L 12/28; H04L 12/56
(52) U.S. Cl. .................. 370/395.62; 370/518; 370/503; 370/474
(58) Field of Search .......................... 370/395.62, 252, 370/253, 395.1, 395.6, 395.61, 395.63, 395.7, 395.71, 395.72, 412, 503, 507, 517–518

(56) References Cited

U.S. PATENT DOCUMENTS

| | | | |
|---|---|---|---|
| 4,961,188 A | | 10/1990 | Lau |
| 5,007,070 A | * | 4/1991 | Chao et al. .................. 375/371 |
| 5,204,882 A | | 4/1993 | Chao et al. |
| 5,260,978 A | | 11/1993 | Fleischer et al. |
| 5,274,680 A | * | 12/1993 | Sorton et al. ................ 375/371 |
| 5,396,492 A | | 3/1995 | Lien |
| 5,526,362 A | | 6/1996 | Thompson et al. |
| 5,608,731 A | | 3/1997 | Upp et al. |
| 5,778,218 A | * | 7/1998 | Gulick ........................ 713/503 |
| 5,844,891 A | * | 12/1998 | Cox ........................ 370/395.62 |
| 6,011,823 A | | 1/2000 | Bleiweiss et al. |
| 6,111,878 A | | 8/2000 | Powell |
| 6,157,646 A | | 12/2000 | Nichols |
| 6,167,048 A | * | 12/2000 | Law et al. .............. 370/395.62 |
| 6,363,073 B2 | | 3/2002 | Nichols |
| 6,400,683 B1 | * | 6/2002 | Jay et al. .................... 370/229 |

FOREIGN PATENT DOCUMENTS

| | | | | |
|---|---|---|---|---|
| EP | 0 622 918 A2 | 11/1994 | | |
| EP | 0705000 A2 | 4/1996 | | |
| EP | 0800326 A2 | 10/1997 | | |
| EP | 0 876 016 A1 | 11/1998 | | |
| EP | 0 915 587 A2 | 11/1999 | | |
| FR | 2746230 | 9/1997 | | |
| FR | 000915587 A2 | * 11/1998 | ............. H04L/7/00 |
| JP | 09036846 A | 2/1997 | | |
| JP | 09214477 A | 8/1997 | | |
| WO | WO 95/33320 | 12/1995 | | |

OTHER PUBLICATIONS

Lau, Richard C., et al., "Synchronous Techniques for Timing Recovery in BISDN", IEEE Transactions on Communications, 43 (1995), pp. 1810–1818.

"Circuit Emulation Service Interoperability Specification Version 2.0", af–vtoa–0078.00, The ATM Forum Technical Committee, i–93, (Jan. 1997).

Mulvey, M., et al., "Jitter/Wander Analysis of Adaptive Clock Recovery for Constant Bit Rate Services Over ATM", BT Technology Journal, 13, 46–51, (Jul., 1995).

Mulvey, M., et al., "Timing Issues of Constant Bit Rate Services over ATM", BT Technology Journal, 13, 35–45, (Jul. 1995).

* cited by examiner

Primary Examiner—Wellington Chin
Assistant Examiner—Yvonne Q. Ha
(74) Attorney, Agent, or Firm—Fogg and Associates, LLC; David N. Fogg; Laura A. Ryan

(57) ABSTRACT

The present invention includes a method for clock recovery in a packet network. The method includes a network which receives data packets at a destination node. Then the data packets are stored in a buffer. The data packets are read out of the buffer by using a locally generated clock. The fill level of the buffer is monitored over a first period of time. A relative maximum fill level for the buffer is identified during the first period of time. Further, the relative maximum fill level is used to control the frequency of the locally generated clock so as to control the rate at which data is read out of the buffer.

20 Claims, 1 Drawing Sheet

ADAPTIVE CLOCK RECOVERY FOR CIRCUIT EMULATION SERVICE

TECHNICAL FIELD OF THE INVENTION

The present invention relates generally to the field of telecommunications and in particular, to adaptive clock recovery for circuit emulation service.

BACKGROUND OF THE INVENTION

Asynchronous Transfer Mode (ATM) is a packet oriented technology for the realization of Broadband Integrated Services Network ("BISDN"). By using ATM, various services including voice, video, and data, can be multiplexed, switched, and transported together in a universal format thus permitting network resources to be shared among multiple users. The full integration of various services may also allow simpler and more efficient network and service administration and management. A constant bit rate ("CBR") signal transported through a broadband ATM network is usually referred to as circuit emulation. Accommodation of CBR services is, however, an important feature of ATM, both for universal integration and for compatibility between existing and future networks. A CBR signal transported through a broadband network is first segmented into 47-octet units and then mapped, along with an octet of ATM Type 1 Adaption Layer ("AAL") overhead, into the 48-octet payload of the cell. An ATM switcher multiplexes the cell through the ATM network. Typically, a source node sends data regulated by a service clock through an ATM network to a destination node.

A clock controlling a destination node buffer must operate at a frequency matched to that of the service signal input at the source node to avoid loss of information. ATM networks inherently transfer data across the network in a "bursty" fashion, i.e., not at a constant bit rate. Thus, when a CBR service is implemented in a packet network, such as an ATM network, a buffer is used at the destination node to store data temporarily. The data in the buffer is read out at a constant bit rate established by a local clock at the destination node. The bursty nature of the ATM network and other packet networks has introduced problems in using an adaptive clock recovery scheme to synchronize the local clock at the destination node with the service clock at the source node.

ATM networks introduce random delays in the transmission of data packets between two nodes. This is referred to as Cell Transfer Delay Variation ("CTDV"). Unfortunately, the CTDV may introduce significant wander components into a clock signal at a destination node that uses an adaptive clock recovery scheme. When significant wander components are contained in the CTDV, the clock signal generated by current adaptive clock recovery schemes at the destination node may follow CTDV, not the service clock of the source node. Service clock wander is masked by unrelated "errors" introduced by CTDV, and the resulting recovered clock at the destination node probably exceeds limits placed on the system wander levels, and may contain a jitter as well.

For the reasons stated above, and for other reasons stated below which will become apparent to those skilled in the art upon reading and understanding the present invention, there is a need in the art for improvements in adaptive clock recovery for circuit emulation service ("CES").

SUMMARY OF THE INVENTION

The above-mentioned problems associated with adaptive clock recovery for circuit emulation service are addressed by the present invention. A circuit and method for adaptive clock recovery for CES that uses a peak buffer fill level as an indicator to lock a local clock at a destination node with the service clock at a source node is disclosed.

In particular, an illustrative embodiment of the present invention includes a method for clock recovery in a packet network. The method includes a network which receives data packets at a destination node. The data packets are stored in a buffer. The data packets are read out of the buffer by using a locally generated clock. The fill level of the buffer is monitored over a first period of time. A relative maximum fill level for the buffer is identified during the first period of time. Further, the relative maximum fill level is used to control the frequency of the locally generated clock so as to control the rate at which data is read out of the buffer. This unique clock control algorithm and mechanism produces a recovered clock which contains no jitter.

DETAILED DESCRIPTION OF THE INVENTION

Figure 1:
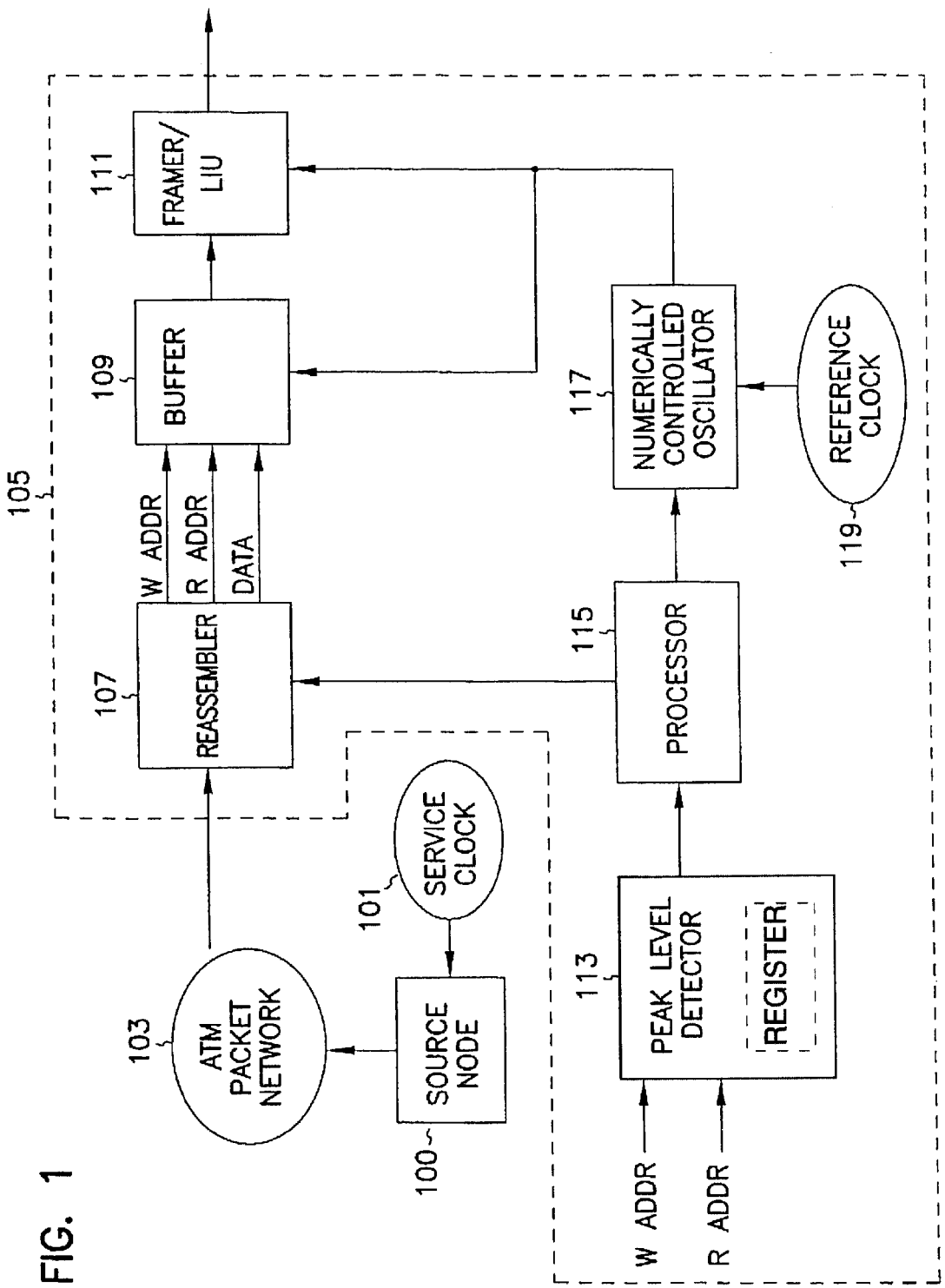
FIG. 1 is a block diagram of an embodiment of a packet network that uses adaptive clock recovery at a destination node according to the teachings of the present invention.

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

FIG. 1 is a block diagram of an illustrative embodiment of the present invention. A source node 100 sends data packets through an ATM network 103 to a destination node 105. A service clock 101 regulates the rate at which the source node 100 transmits data to the destination node 105.

Destination node 105 receives and processes data packets from source node 100. Advantageously, destination node 105 uses an adaptive clock recovery scheme that monitors a peak buffer fill level to lock a local oscillator of destination node 105 with the frequency of service clock 101 in a manner that meets system wander limits.

Destination 105 includes reassembler 107. Reassembler 107 receives the data packets from the source node 100 and places the data packets in proper sequence. Reassembler 107 is coupled to buffer 109. Buffer 109 is coupled to framer/Line Interface Unit (L.I.U.) 111. Buffer 109 receives the data packets from the reassembler 107 then passes the data packets, sequentially to the framer/L.I.U. 111. Framer/L.I.U. 111 receives the data packets from the buffer 109 and passes the data from the data packets according to the original format. Any data format can be used by the framer/L.I.U. 111. In one embodiment, the data is formatted for transmission on a T1 line.

The reading and writing of data to and from buffer 109 is controlled by addresses label W ADDR ("write address") and R ADDR ("read address"). The write address identifies where the most recent data was written to buffer 109 from reassembler 107. The read address identifies where the most recent data was read from buffer 109 by framer/L.I.U. 111.

Thus, the difference between these two addresses is indicative of a fill level of the buffer.

As data is processed by destination node 105, read and write addresses are compared by peak fill level detector 113 and the difference is stored in a register. The peak fill level detector 113 may be implemented in a Field Programmable Gate Array ("FPGA") or may be performed by the microprocesssor, if every buffer fill sample is made available. Peak fill level detector 113 continues to compare read and write addresses for a period of time, e.g., one to two seconds, to check if the new buffer fill level based on the difference between the read address and write address is greater than the current value in the register. If so, the peak fill level detector 113 replaces the value in the register with the current buffer fill level. Ultimately, at the end of the period of time, the register contains a peak fill level for the buffer 109.

At the end of the period of time, a processor 115 reads the register in the peak fill level detector 113 to get the peak fill number. Processor 115 clears the register to zero. Peak fill level detector 113 then repeats the process to obtain further peak fill numbers for further time periods.

Processor 115 uses the peak fill number from the register and a clock control algorithm to adjust, as necessary, the input to a numerically controlled oscillator 117. The output of the numerically controlled oscillator 117 is the local clock of destination node 105 and, by means of an adaptive algorithm, is locked to service clock 101. This process excludes data for loop control that has been corrupted by Cell Transfer Delay Variation.

Numerically controlled oscillator 117 establishes an output frequency based on a number provided by processor 115 and the frequency of reference clock 119. In one embodiment, numerically controlled oscillator 117 comprises a Direct Digital Synthesis ("DDS") integrated circuit available from Analog Devices. Further, reference clock 119 is a clock with an accuracy of a stratum 1, 2, or 3E clock. The frequency of reference clock 119, is thus, assumed to be fixed at a selected level, e.g., 19.44 MHZ. Thus, to control the frequency of the signal output by numerically controlled oscillator 117, it is only necessary to determine the appropriate numeric value to provide to numerically controlled oscillator 117. This process results in a recovered clock that contains no jitter.

Source node 100 can transmit signals to destination node 105 in a number of different standard formats. For example, these formats include, but are not limited to, DS1, E1, E3, and DS3. Each of these formats has a nominal frequency associated with it. A number for numerically controlled oscillator 117 that will achieve a target frequency is calculated according to equation 1:

$$\text{Number} = \frac{\text{Target Frequency} \times 2^{32}}{\text{Reference Frequency}} \quad (1)$$

In Equation 1, the Target Frequency is the nominal frequency for the selected service, e.g., 1.544 MHZ for DS1, 2.048 MHZ for E1, 17.184 MHZ for E3 and 22.368 MHZ for DS3 service. The reference frequency is the frequency of reference clock 119. The number, $2^{32}$, represents the highest value of the 32 bit number that can be applied to numerically controlled oscillator 117. Essentially, the number applied to numerically controlled oscillator 117 sets a ratio between the frequency of the output and the reference clock 119. In the case of DS1 and E1, a 19.44 MHz reference clock can be used. Similarly, a 77.76 MHZ reference frequency clock can be used for E3 and DS3 service, but a 2× clock multiplier follows the numerically controlled oscillator output to achieve the required 34.368 MHz for E3, and 44.736 MHz for DS3. Newer DDS circuits can produce the required output frequency directly. With these values, the number that achieves these nominal frequencies for the identified services are as follows:

| Service | Number |
|---------|--------|
| DS1 | 341,122,916.925 |
| E1 | 452,473,920.896 |
| E3 | 949,134,748.129 |
| DS3 | 1,234,465,901.19 |

Since only integer numbers can be provided, the next highest and next lowest integer values are used. The frequencies that result from these values can be calculated according to Equation 2:

$$\text{Frequency} = \frac{\text{Number} \times \text{Reference Frequency}}{2^{32}} \quad (2)$$

This results in the following frequencies for each service:

| Service | Frequency (High) | Frequency (Low) | Difference |
|---------|------------------|-----------------|------------|
| DS1 | 1,544,000.00034 Hz | 1,543,999.99581 Hz | 0.00453 Hz |
| E1 | 2,048,000.00047 Hz | 2,047,999.9959 Hz | 0.00457 Hz |
| E3 | 17,184,000.0158 Hz | 17,183,999.9977 Hz | 0.0181 Hz * |
| DS3 | 22,368,000.0146 Hz | 22,367,999.9965 Hz | 0.0181 Hz * |

From the difference values, the effect of a one bit change in the value of the number can be calculated for each service:

$$\text{Effect} = \frac{\text{Difference}}{\text{Nominal Frequency(in MHz)}} \quad (3)$$

For each service, the effect, in nanoseconds-per-second is as follows:

| Service | Effect |
|---------|--------|
| DS1 | 2.9339 |
| E1 | 2.231 |
| E3 | 1.053 * |
| DS3 | 0.8092 * |

* The difference frequency in equation (3) must be 2 times the table value, because the DDS output frequencies are doubled to achieve the required frequencies.

Essentially, processor 115 can calculate the rate of change of the buffer fill level in terms of a nanosecond-per-second value. Based on this value, processor 115 can determine an amount by which to adjust the number provided to numerically controlled oscillator 117 to compensate for the change in the buffers fill level using the above numbers for the selected service.

Processor 115 uses a clock control algorithm to acquire frequency and phase lock and to track phase of the service clock 101 by the destination node 105. The clock control algorithm has three different functions: 1. frequency acquisition, 2. phase acquisition, and 3. phase track.

Before transmission of a signal by source node 100, the buffer fill level reduces to zero, because the data is clocked out of the buffer by the numerically controlled oscillator 117, but no valid data is being written into the buffer. The numerically controlled oscillator 117 is then set to a frequency equal to the lowest frequency allowed by specification for service clock 101. When data is received at the buffer 109, the buffer fill level changes. This change is calculated as a nanosecond per second change. Based on this value, a change in the number to the numerically controlled oscillator 117 can be calculated and written to reduce the frequency offset to zero.

Phase uncertainty is introduced at destination node 105 since buffer 109 is configured byte-wide. This introduces an 8-unit interval (UI) uncertainty in the buffer fill level. By the time frequency lock is achieved, there is typically a higher fill level than target fill level because the numerically controlled oscillator 117 was set to read data from the buffer 109 at a slower rate than data written to the buffer 109, in order to accumulate data to calculate frequency offset. After frequency acquisition, buffer 109 fill level is reduced to target level at a controlled rate to avoid data loss. This is achieved by increasing the frequency of the numerically controlled oscillator 117 to a slightly higher value than the frequency of service clock 101. Once the buffer fill level is reduced to the selected target level, the frequency of the numerically controlled oscillator 117 is lowered slightly below the frequency lock value in order to transition between a target byte and a next higher byte. When this boundary is located, the number of the numerically controlled oscillator 117 will be changed to the zero frequency offset number. At this point, a phase detector with bit level resolution is realized.

The last function of the clock algorithm is the phase track where a number from the numerically controlled oscillator 117 is adjusted by one digit or more digits as required to maintain phase alignment at the byte boundary described.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the present invention is not limited to applications using asynchronous transfer mode ("ATM") networks. Further, any communication medium can be used to transfer data packets from a source node to a destination node.

What is claimed is:

1. A method for clock recovery in a packet network, the method comprising:

receiving data packets at a destination node;

storing data from the data packets in a buffer;

reading tile data packets out of the buffer using a locally generated clock;

monitoring a fill level of the buffer over a first period of time;

identifying a relative maximum fill level for the buffer during the first period of time, wherein identifying a relative maximum fill level comprises comparing read and write address for the buffer and updating a register for a period of time when a buffer fill level, based on the difference between the read and write addresses is larger than a value previously stored in the register; and using the relative maximum fill level to control a frequency of the locally generated clock so as to control the rate at which data is read out of the buffer.

2. The method of claim 1, wherein receiving data packets at the destination node comprises receiving data packets at a reassembler, wherein the reassembler places the data packets in proper sequence then transmits the data packets to the buffer.

3. The method of claim 2, wherein storing the data packets in the buffer comprises, writing data from the data packets into the buffer.

4. The method of claim 3, and further comprising passing the data from the buffer to a Line Interface Unit, without altering payload of the data packets.

5. The method of claim 4, wherein monitoring a fill level of the buffer comprises monitoring a difference between a read address and a write address of the buffer.

6. The method of claim 5, wherein identifying a relative maximum fill level flyer comprises storing a value in a register.

7. A method for clock recovery in a packet network, the method comprising:

receiving data packets at a destination node;

storing data from the data packets in a buffer;

reading the data packets out of the buffer using a locally generated clock;

monitoring a fill level of the buffer over a first period of time;

identifying a relative maximum fill level for the buffer during the first period of time; and using the relative maximum fill level to control a frequency of the locally generated clock so as to control the rate at which data is read out of the buffer, wherein using the relative maximum fill level comprises, at the and of a period, reading a register of a peak fill level detector to get the a peak fill number and applying a clock control algorithm based on the value from the register to control a numerically controlled oscillator.

8. A node in a telecommunications network, comprising:

a reassembler, wherein the reassembler receives data packets from the telecommunications network;

a buffer, coupled to a framer/Line Interface Unit, wherein the buffer receives data from the data packets from the reassembler;

a peak fill level detector, responsive to address signals for the buffer, wherein the peak fill level detector includes a register that stores a peak fill number acquired during a first period of time, wherein the peak fill detector comprises a mechanism that compares a read address and a write address for the buffer and stores the maximum buffer fill level observed over a period of time;

a variable oscillator coupled to the framer/Line Interface Unit and the buffer that controls the rate at which data is processed in the node; and a processor coupled to the peak fill level detector, wherein the processor receives the peak fill number from the register and uses a clock control algorithm to adjust, selectively an input to the variable oscillator.

9. The node of claim 8, wherein the reassembler separates data packets and puts the data packets in proper sequence.

10. The node of claim 9, wherein the peak fill level detector includes a register that is continuously updated over a period of time with a relative maximum buffer fill level.

11. The node of claim 10, wherein the framer/Line Interface Unit, passes data from the buffer to an output line in a format originally received by the telecommunications network.

12. The node of claim 8, wherein the variable oscillator comprises a numerically controlled oscillator.

13. The node of claim 8, wherein the variable oscillator comprises a direct digital synthesis oscillator.

14. A method for adaptive clock recovery, the method comprising:
    monitoring a buffer fill level for a period of time;
    identifying a relative maximum fill level during the period of time; and
    controlling the frequency of a recovered clock signal based on the relative maximum fill level such that the recovered clock signal is substantially tree of jitter;
    wherein controlling the frequency of the recovered clock signal comprises:
        determining a rate of change in the relative maximum fill level; and
        calculating a numerical value for a numerically controlled oscillator to compensate for the rate of change.

15. The method of claim 14, and further comprising adjusting the value for the numerically controlled oscillator to reduce phase uncertainty.

16. The method of claim 14, wherein monitoring a buffer fill level comprises comparing read and write addresses for the buffer.

17. A destination node implementing adaptive clock recovery, the node comprising:
    a buffer that receives data from a communication channel;
    a peak fill level detector circuit, responsive to the buffer, that determines a relative peak buffer fill level over a period of time;
    an oscillator that controls the rate at which data is read out of the buffer; and
    a processor coupled to the peak fill level detector and the oscillator to control the frequency of the oscillator based on the relative peak buffer fill level;
    wherein the processor implements frequency and phase acquisition.

18. The node of claim 17, wherein the peak fill level detector is implemented in a Field Programmable Gate Array.

19. The node of claim 17, wherein the oscillator comprises a numerically controlled oscillator.

20. The node of claim 17, wherein the processor further implements phase tracking for the oscillator.

* * * * *

UNITED STATES PATENT AND TRADEMARK OFFICE
CERTIFICATE OF CORRECTION

PATENT NO. : 6,721,328 B1
DATED : April 13, 2004
INVENTOR(S) : Nichols et al.

It is certified that error appears in the above-identified patent and that said Letters Patent is hereby corrected as shown below:

Column 5,
Line 53, please replace "tile" with -- the --

Column 6,
Line 31, please replace "buffer," with -- buffer; --;
Line 33, please replace "and of" with -- end of --;
Line 34, please replace "get the a" with -- get a --.

Column 7,
Line 13, please replace "tree" with -- free --.

Signed and Sealed this

Second Day of August, 2005

JON W. DUDAS
*Director of the United States Patent and Trademark Office*